United States Patent
Stanek et al.

(10) Patent No.: US 12,228,267 B2
(45) Date of Patent: Feb. 18, 2025

(54) OPTICAL SYSTEM FOR AN AUTOMATED LUMINAIRE

(71) Applicant: ROBE lighting s.r.o., Roznov pod Radhostem (CZ)

(72) Inventors: Michal Stanek, Valasske Mezirici (CZ); Jan Vilem, Valasske Mezirici (CZ); Tomas David, Podoli (CZ); Jindrich Vavrik, Zubri (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/799,783

(22) Filed: Aug. 9, 2024

(65) Prior Publication Data
US 2024/0401777 A1    Dec. 5, 2024

Related U.S. Application Data

(60) Provisional application No. 63/579,734, filed on Aug. 30, 2023.

(51) Int. Cl.
| | | |
|---|---|---|
| *F21V 14/02* | (2006.01) | |
| *F21V 5/04* | (2006.01) | |
| *F21Y 107/10* | (2016.01) | |
| *F21Y 113/00* | (2016.01) | |
| *F21Y 115/10* | (2016.01) | |

(52) U.S. Cl.
CPC ............... *F21V 14/02* (2013.01); *F21V 5/048* (2013.01); *F21Y 2107/10* (2016.08); *F21Y 2113/00* (2013.01); *F21Y 2115/10* (2016.08)

(58) Field of Classification Search
CPC ........ F21V 14/02; F21V 5/048; F21V 14/025; F21Y 2107/10; F21Y 2115/10; F21Y 2113/00
See application file for complete search history.

(56) References Cited

U.S. PATENT DOCUMENTS

| | | | |
|---|---|---|---|
| 6,259,512 B1 * | 7/2001 | Mizouchi | G03F 7/70075 355/71 |
| 2017/0314753 A1 * | 11/2017 | Gammer | F21K 9/64 |
| 2019/0041039 A1 | 2/2019 | Vilem et al. | |
| 2020/0109833 A1 * | 4/2020 | Jiang | F21S 19/00 |

OTHER PUBLICATIONS

Stanek, Michael, et al.; U.S. Appl. No. 18/799,788; Filing Date: Aug. 9, 2024; Title: Optical System for an Automated Luminaire; 34 pages.
Office Action dated Nov. 19, 2024; U.S. Appl. No. 18/799,778, filed Aug. 9, 2024; 18 pages.

* cited by examiner

*Primary Examiner* — Bao Q Truong

(74) *Attorney, Agent, or Firm* — Conley Rose, P.C.; Brooks W Taylor

(57) ABSTRACT

An optical system includes a light source, a lens, and a light effect ring. The lens has first and second surfaces and receives a first light beam from the light source at the first surface and emits a second light beam from the second surface. The light effect ring includes a first plurality of light emitters emitting second light beams that obliquely illuminate the first surface of the lens and a second plurality of emitters that emit third light beams through the lens. The light effect ring may include a plurality of segments that move into and out of the first light beam, where each segment includes a first subset of the first plurality of light emitters and a second subset of the second plurality of emitters.

18 Claims, 9 Drawing Sheets

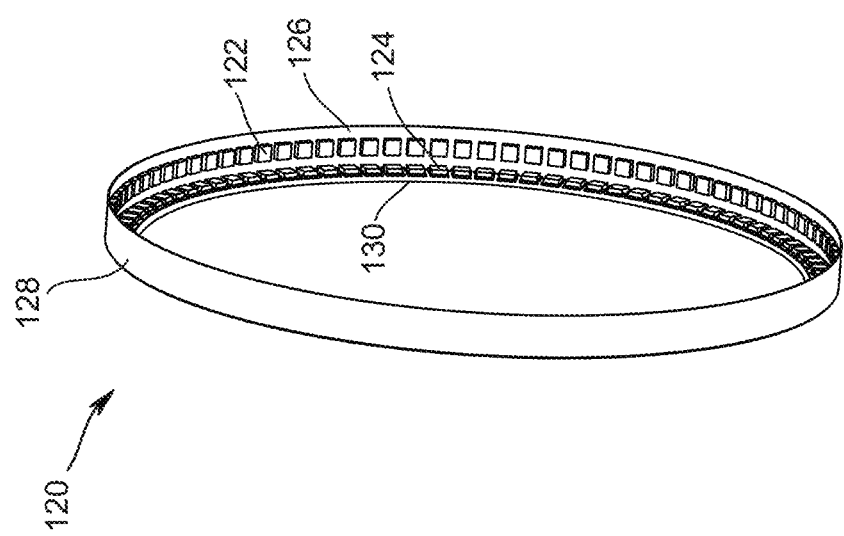

OPTICAL SYSTEM FOR AN AUTOMATED LUMINAIRE

CROSS-REFERENCE TO RELATED APPLICATIONS

This patent application claims the benefit of U.S. Provisional Application No. 63/579,734, filed Aug. 30, 2023, entitled "OPTICAL SYSTEM FOR AN AUTOMATED LUMINAIRE" which is hereby incorporated by reference in its entirety.

TECHNICAL FIELD OF THE DISCLOSURE

The disclosure generally relates to luminaires, and more specifically to an optical system for an automated luminaire.

BACKGROUND

Some luminaires in the entertainment and architectural lighting markets include automated and remotely controllable functions. Such luminaires may be used in theatres, television studios, concerts, theme parks, night clubs and other venues. A luminaire may provide control over the pan and tilt functions of the luminaire, allowing the operator to control the direction the luminaire is pointing and thus the position of the light beam on the stage or in the studio. Such position control may be obtained via control of the luminaire's position in two orthogonal rotational axes, which may be referred to as pan and tilt. Some luminaires provide control over other parameters such as intensity, color, focus, beam size, beam shape, and/or beam pattern.

The optical systems of such automated luminaires may be designed to enable a user to control the beam size, from a very narrow output beam to a wide (or "wash") beam. Such control may allow such luminaires to be used with long throws to a target or for almost parallel-beam light effects as well as for wider, more traditional wash effects. Optical systems with the ability to produce narrow beams may be referred to as 'Beam' optics, while optical systems with the ability to produce wide beams may be referred to as 'Wash' optics.

SUMMARY

An optical system includes a light source, a lens, and a light effect ring. The lens has a first surface and a second surface and is configured to receive at the first surface a first light beam originating at the light source and to emit a second light beam from the second surface. The light effect ring includes first and second pluralities of light emitters and a plurality of segments. The first plurality of light emitters are configured to emit second light beams to obliquely illuminate the first surface of the lens. The second plurality of emitters are configured to emit third light beams through the lens. The plurality of segments are configured for motion into and out of the first light beam. Each segment of the plurality of segments comprises a first subset of the first plurality of light emitters and a second subset of the second plurality of emitters.

An optical system includes a light source, a lens, and a light effect ring. The lens has a first surface and a second surface and is configured to receive at the first surface a first light beam originating at the light source and to emit a second light beam from the second surface. The light effect ring includes first and second pluralities of light emitters. The first plurality of light emitters are configured to emit second light beams to obliquely illuminate the first surface of the lens. The second plurality of emitters are configured to emit third light beams through the lens.

BRIEF DESCRIPTION OF THE DRAWINGS

For a more complete understanding of this disclosure, reference is now made to the following brief description, taken in conjunction with the accompanying drawings in which like reference numerals indicate like features.

FIG. 6A presents an isometric view of a first light effect ring according to the disclosure;

DETAILED DESCRIPTION

Preferred embodiments are illustrated in the figures, like numerals being used to refer to like and corresponding parts of the various drawings.

Some zoom optical systems comprise a large number of lenses, which may make such zoom optical systems heavier, larger, and/or more costly to produce. Embodiments of zoom optical systems according to the disclosure comprise only nine lenses, making them potentially lighter, smaller, and less costly than such other zoom optical systems. Additionally, other zoom optical systems may comprise aspheric lenses, which may be more costly to fabricate. Embodiments of zoom optical systems according to the disclosure comprise only spherical lenses (where non-planar lens surfaces are used), making them potentially less costly than such other zoom optical systems.

Some luminaires in a lighting system may be visible to audience members, thereby becoming a part of the staging of the show. When the audience views the front of the head of a luminaire, they may see the fixed objective lens through which the light beam is emitted and may see something of the housing of the luminaire, depending on ambient illumination. The emitted beam may be narrow or wide and the lens may be slightly illuminated by the emitted beam.

In contrast to the control the operator may have over the appearance of other set pieces and truss elements that are equipped with, for example, color controllable strip lighting, such luminaires do not allow the operator independent control of the appearance of the front of the head of the luminaire. A light effect ring according to the disclosure provides the operator such control by enabling, if desired, one or more colors to be seen in the frontmost lens of the luminaire when the luminaire is viewed by the audience. The ring may present a solid color or a pattern of colors, the effect may be static or varying ("dynamic"), and may have a desired intensity, all under the control of the operator.

Figure 1:
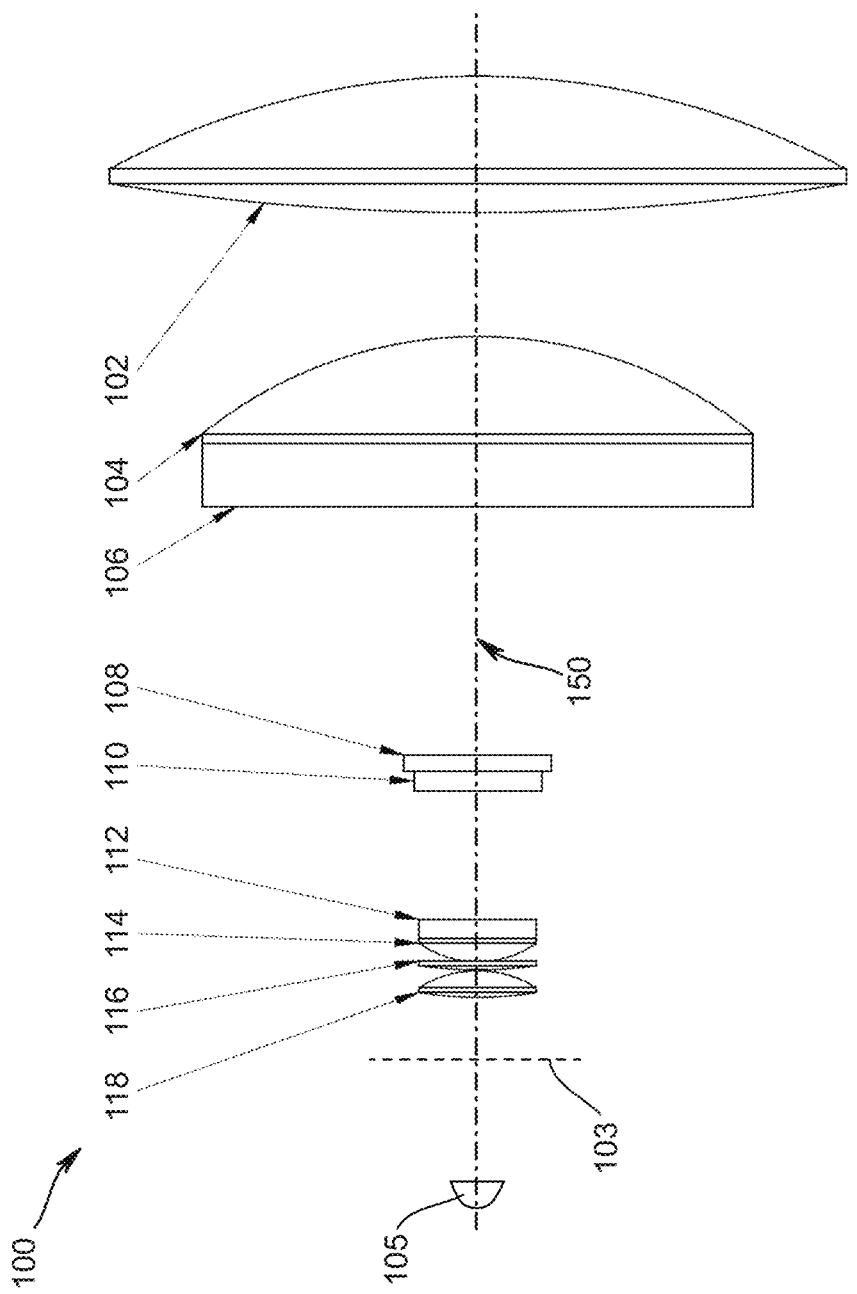
FIG. 1 presents a side view of a zoom optical system according to the disclosure in a first configuration.

FIG. 1 presents a side view of a zoom optical system 100 according to the disclosure in a first configuration. The zoom optical system 100 comprises a light source 105 and an object plane 103. The zoom optical system 100 includes an optical axis 150. One or more objects to be imaged by the zoom optical system 100 are located in or adjacent to the object plane 103. Examples of objects to be imaged include a static or rotating gobo mounted on a gobo wheel or other gobo carrier, and a variable iris, an aperture wheel, or other mechanism for producing a light beam of a selected size. Where more than one such object to be imaged is included in the zoom optical system 100, it will be understood that the objects may be located in individual planes adjacent to the object plane 103. As shown in FIG. 1, the left end of the zoom optical system 100 may be referred to as the object end and the right end as the image end.

The zoom optical system 100 further comprises nine lenses in three lens groups: lenses 102, 104, and 106 ("Objective" group); lenses 108 and 110 ("Variator" group); and lenses 112, 114, 116, and 118 ("Compensator" group). The lens elements of the embodiment shown in FIG. 1 are described in Table 1. As described below, FIGS. 2-5 also show the lenses of the zoom optical system 100. The column Group of Table 1 indicates the lens group of each lens element.

The columns Diameter, R1, and R2 present a prescription for the shape of each lens element, where "mm" indicates that the unit of measurement is millimeters (mm). R1 describes a curvature of an image side of the lens element (right-hand side in FIG. 1) and R2 describes a curvature of an object side of the lens element (left-hand side in FIG. 1). As may be seen in FIG. 3, a positive value of R1 indicates a convex image side surface of the lens element and a negative value of R1 indicates a concave image side surface of the lens element. As may also be seen in FIG. 3, a positive value of R2 indicates a concave object side surface of the lens element and a negative value of R2 indicates a convex object side surface of the lens element. For the purposes of this disclosure, radii of curvature within 10% of the disclosed radii are considered substantially equal to the disclosed radii of curvature.

The column Spacing indicates the spacing of elements within that lens group, where the unit of measurement is millimeters. The column Glass Type specifies a type of glass material for each lens. Glass type values that include the letter "F" identify a lens made of flint glass. Glass type values that include the letter "K" identify a glass made of crown glass. The column Power indicates whether the lens element has a positive or negative optical power.

TABLE 1

| Lens | Group | Diameter (mm) | Spacing (mm) | R1 (mm) | R2 (mm) | Glass Type | Power |
|------|-------|---------------|--------------|---------|---------|------------|-------|
| 102 | Objective | 300 | 50.1 | 316.6 | −960.3 | H-K9L | Positive |
| 104 | Objective | 224 | Cemented | 178.0 | −511.2 | H-K9L | Positive |
| 106 | Objective | 224 | — | −511.2 | 591.2 | H-ZFL7A | Negative |
| 108 | Variator | 60 | 3.1 | −331.7 | 146.5 | H-ZK9A | Negative |
| 110 | Variator | 60 | — | −265.2 | 73.8 | H-ZK9A | Negative |
| 112 | Compensator | 48 | 2.2 | −113.4 | 79.4 | H-ZFL7A | Negative |
| 114 | Compensator | 48 | 0.3 | 242.5 | −41.7 | H-K9L | Positive |
| 116 | Compensator | 48 | 0.3 | −487.8 | −161.6 | H-ZFL7A | Positive |
| 118 | Compensator | 48 | — | 44.5 | −144.1 | H-K9L | Positive |

In some embodiments, all of the objective, variator, and compensator lens groups are configured for motion along an optical axis 150 of the zoom optical system 100 relative to each other and to the object plane 103. In other embodiments, the lens 102 of the objective lens group is fixed in place at an exit aperture of a luminaire 1100 (described in more detail with reference to FIG. 11) comprising the zoom optical system 100. In such embodiments, the objective lens group is not configured for motion and remains in a fixed position on the optical axis, while the variator, and compensator lens groups are configured for motion. As will be shown in more detail in subsequent figures, when the lens groups move relative to each other along the optical axis, the lenses within each lens group remain in the same position relative to each other.

The compensator group lenses form a converging (or positive power) group, the variator group lenses form a diverging (or negative power) group, and the objective group lenses form a converging group. The compensator, variator, and objective lens groups of the zoom optical system 100 have four, two, and three lenses, respectively. It will be recognized by a person of skill in the art that, in other embodiments, positive/negative/positive compensator/variator/objective lens groups may comprise lens groups of more or fewer than four/two/three lenses each, including lens 'groups' with only a single lens.

A first light beam emitted by the light source 105 converges and illuminates an object to be imaged, located in the object plane 103, and then diverges as it approaches the compensator lens group. The compensator lens group receives the first light beam, as modified by any object placed in the first beam in the object plane 103, and emits a second light beam. The variator lens group receives the second light beam and emits a third light beam. The objective lens group receives the third light beam and emits a fourth light beam, which is the light beam emitted by the zoom optical system 100. As such, each of the compensator, variator, and objective lens groups may be said to be optically coupled to its preceding optical element in the zoom optical system 100 and the light beams received by each lens group may be said to have originated at the light source 105.

In various embodiments, the objective lens group moves along the optical axis of the zoom optical system 100 or remains in a fixed location relative to the object plane 103, as discussed above. Both the variator and compensator groups move independently along the optical axis. Movement of the variator lens group primarily controls the overall focal length (light output angle or beam angle) of the emitted light beam. For example, while the compensator lens group remains in a fixed position relative to the object plane, movement of the variator lens group changes the beam angle of the emitted light beam. Movement of the compensator lens group relative to the object plane primarily controls whether an object in the object plane 103 or in a plane adjacent to the object plane 103 is in focus. In combination, the positions of the compensator and variator lens groups determine a beam angle (or zoom) of the emitted beam and a distance from the objective lens group at which a projected image of the object plane is focused. As such, the compensator and variator lens groups may also be referred to respectively as a focus lens group and a zoom lens group. The objective lens group may be referred to as a fixed lens group in embodiments where it remains in a fixed location relative to the object plane 103.

Moving both focus and zoom lens groups affects both zoom and focus, as does moving the objective lens group, although moving the objective lens group affects beam angle more than the distance from the objective lens group at which the projected image of the object plane is focused. Using a three lens group zoom optical system, a luminaire may be designed having any one of the lens groups in a fixed position and the other two lens groups configured to move relative to the fixed lens group.

Moving lens groups may be mechanically coupled to hand-operated manual controls or to motors, linear actuators, or other electromechanical mechanisms for motion. Such electromechanical mechanisms may be electrically coupled to a control system (or controller) 1110 of the luminaire 1100, the control system 1110 configured to control a motion of the electromechanical mechanisms and thus the lens groups. In various embodiments, the control system 1110 comprises a microcontroller or other programmable processing system. In some embodiments, the control system 1110 may be coupled for local control to a user interface 1112 included in the luminaire 1100 and configured to receive therefrom signals relating to desired positions of the electromechanical mechanisms.

In other embodiments, the control system 1110 may be coupled for remote control by a data link (wired or wireless) to a remotely located control console and to receive signals therefrom indicating desired positions along the optical axis for the lens groups of the zoom optical system 100. The data link may use DMX512 (Digital Multiplex) protocol or other suitable communication protocol, e.g., Art-Net, ACN (Architecture for Control Networks), and Streaming ACN. In such embodiments, the control system 1110 is configured to move the focus and/or zoom lens groups in response to signals received via the data link. In some such embodiments, the control system 1110 moves the compensator lens group in response to a control signal received on a first control channel of the data link and moves the variator lens group in response to a control signal received on a second control channel of the data link.

Figure 2:
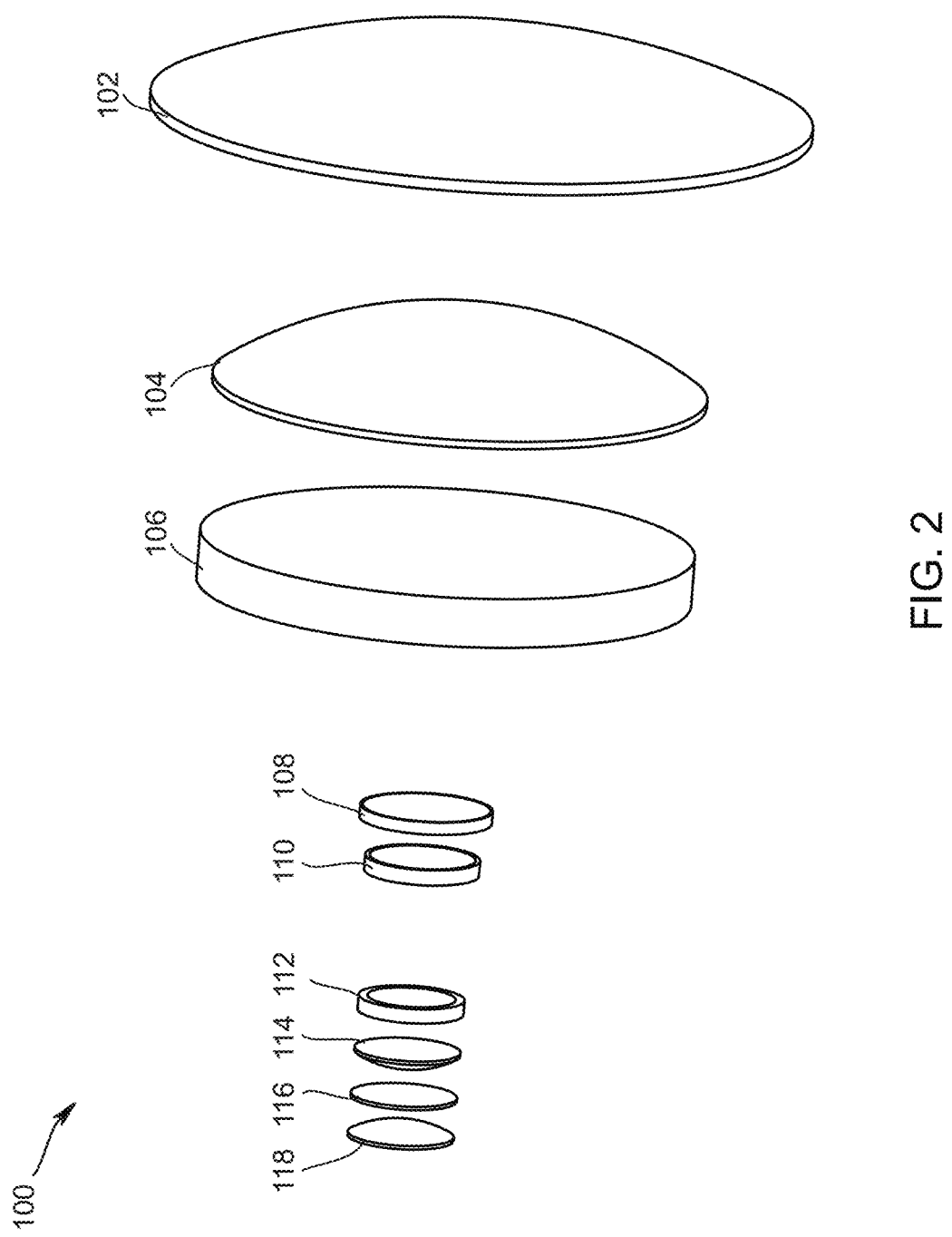
FIG. 2 presents an exploded isometric view of the zoom optical system of FIG. 1 with the elements of the lens groups separated from each other.

FIG. 2 presents an exploded isometric view of the zoom optical system 100 of FIG. 1, with the elements of the lens groups separated from each other. As described above, the zoom optical system 100 is positioned coaxially with a light source that is located at the end of the zoom optical system 100 where the lens 118 is located. The zoom optical system 100 produces a light beam, emitted from lens 102. The compensator lens group is optically coupled to one or more objects in the object plane 103 without intervening lenses. As may be seen in FIG. 2, the variator lens group is coupled to the compensator lens group without intervening lenses and the objective lens group is coupled to the variator lens group without intervening lenses. The objective lens group projects an image of the one or more objects in the object plane without further intervening lenses.

Figure 3:
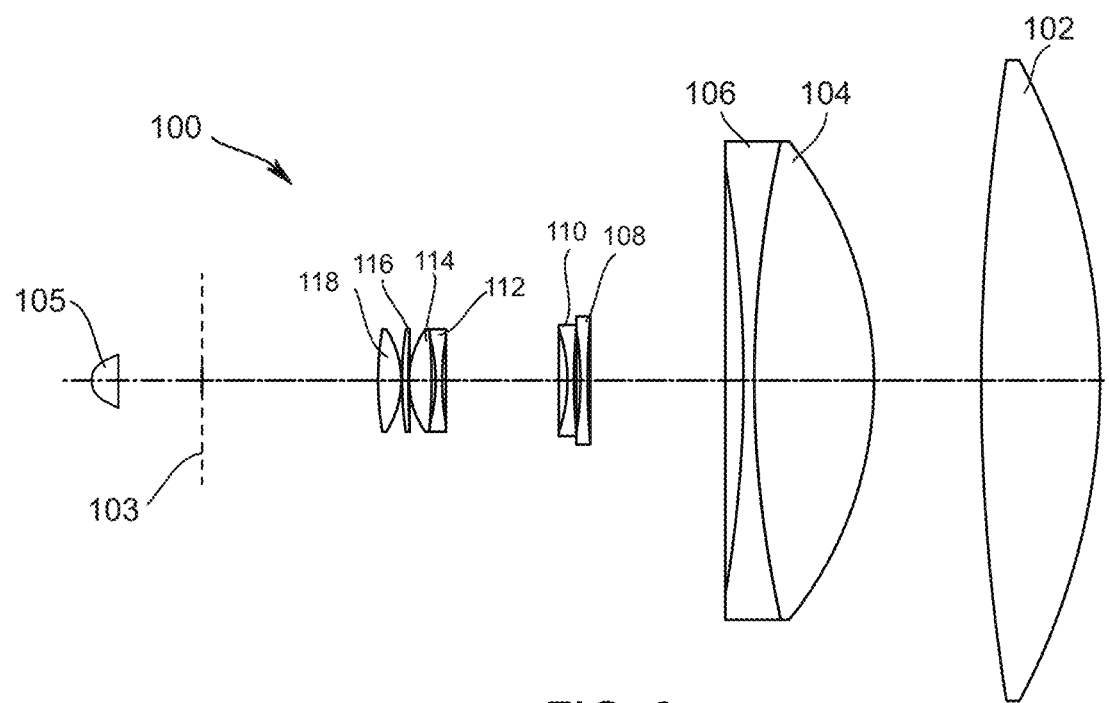
FIG. 3 presents a cross-section side view of the zoom optical system of FIG. 1.
Figure 4:
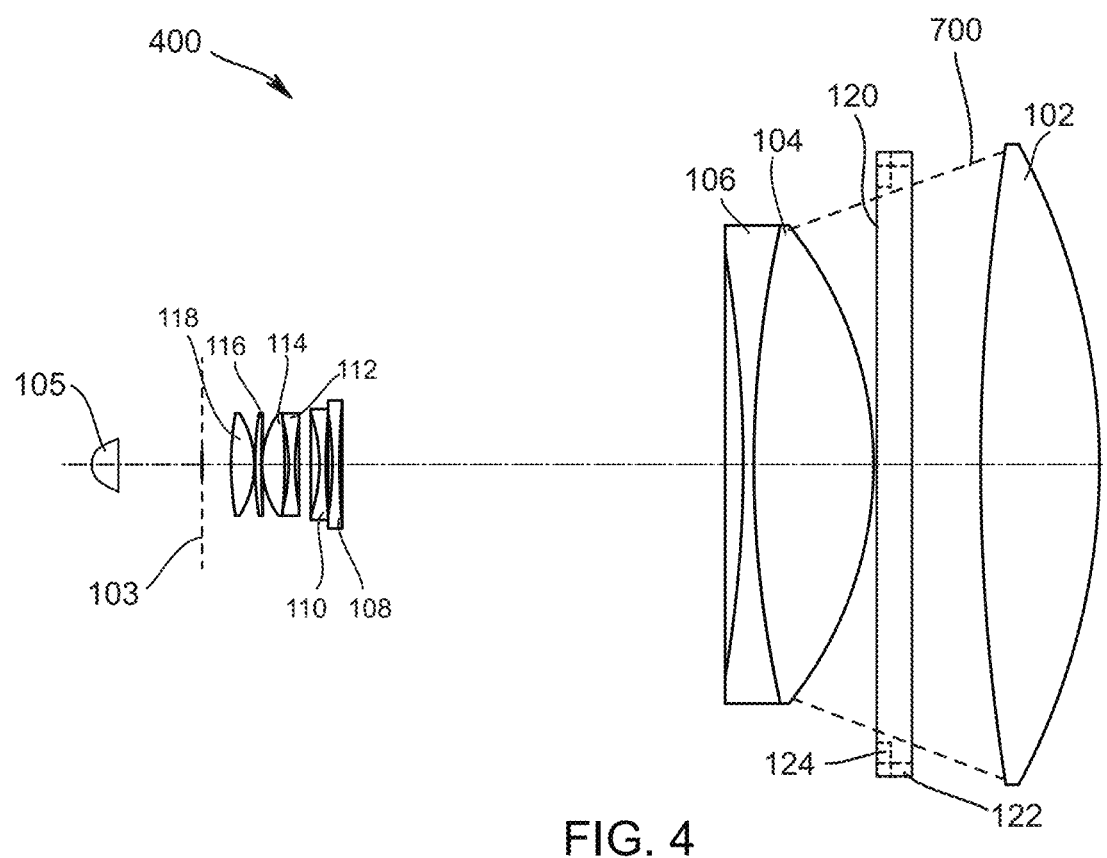
FIG. 4 presents a cross-section side view of a second zoom optical system according to the disclosure.

FIG. 3 presents a cross-section side view of the zoom optical system 100 of FIG. 1. In FIG. 3, the lens groups are positioned in a first configuration that produces a wide angle beam. FIG. 4 presents a side view of a second zoom optical system 400. The zoom optical system 400 comprises the lens groups of the zoom optical system 100 and a first light effect ring 120. FIG. 4 presents a cross-section side view of the lens groups positioned in a second configuration that produces a narrow angle beam. The light effect ring 120 is discussed in more detail with reference to FIGS. 5-8. In various embodiments, the light effect ring 120 may be configured for motion along the optical axis, the motion controllable to configure the zoom optical system 100 with the light effect ring 120 at any position between the lenses 104 and 102.

Figure 5:
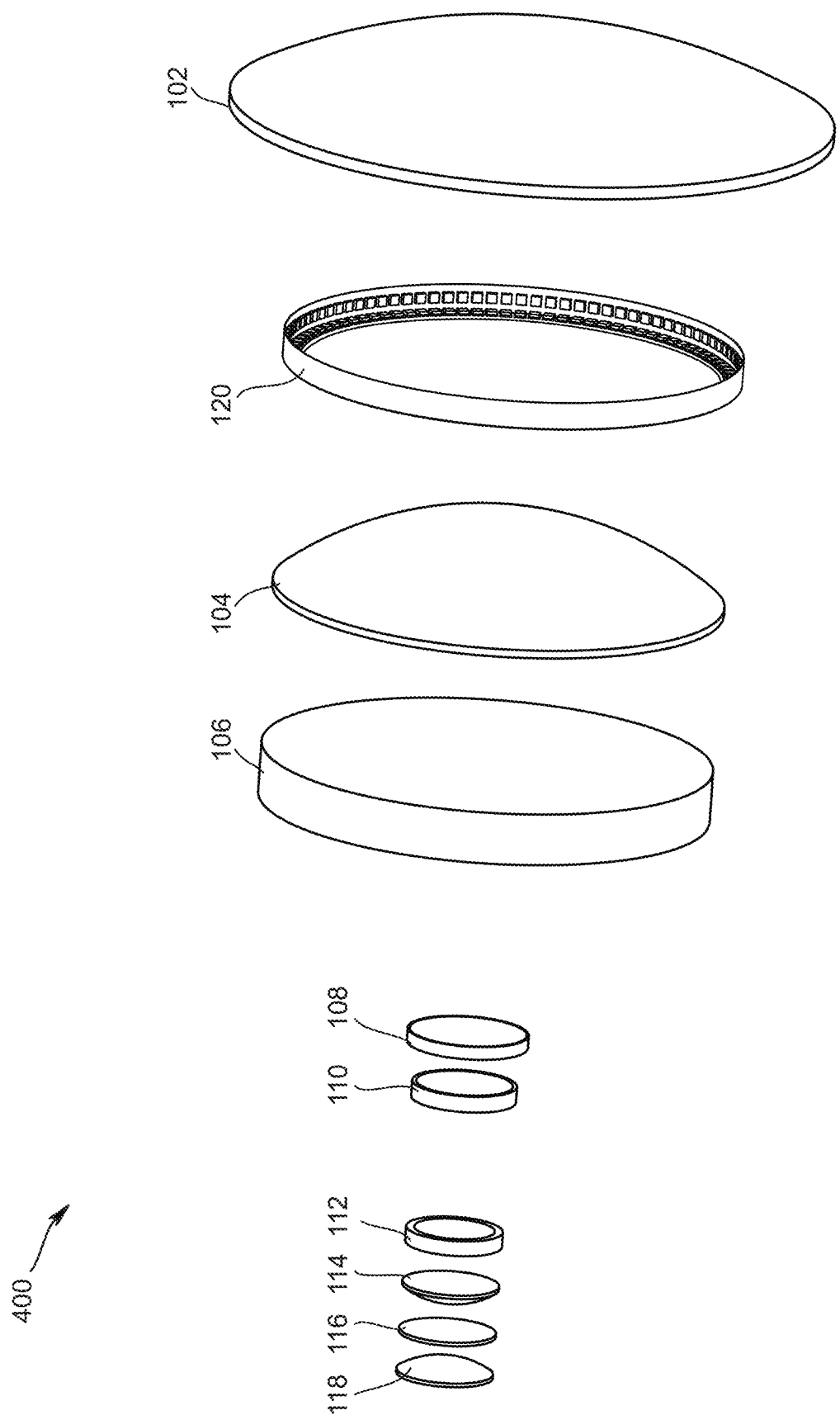
FIG. 5 presents an exploded isometric view of the second zoom optical system of FIG. 4.

FIG. 5 presents an exploded isometric view of the zoom optical system 400 of FIG. 4. As discussed above, the zoom optical system 400 comprises the lens groups of the zoom optical system 100 and the light effect ring 120. In the embodiment shown in FIG. 5, the light effect ring 120 is positioned between lenses 102 and 104. In other embodiments light effect ring 120 may be positioned at any point in the zoom optical system 400.

FIG. 6A presents an isometric view of the light effect ring 120 according to the disclosure. The light effect ring 120 comprises a cylinder having an axis, the cylinder having an inner face 126 and an outer face 128. In the embodiment shown in FIG. 6A, the axis of the light effect ring 120 is colinear with the optical axis 150. In various embodiments, the axis of the light effect ring 120 may be parallel to and offset from the optical axis or may form an angle with the optical axis. A rim 130 extends toward the axis of the light effect ring 120 from an edge of the inner face 126 (the left edge as shown in FIG. 6A).

A first plurality of light emitters 122 are mounted to the inner face 126 and emit light toward the center of the light effect ring 120. A second plurality of light emitters 124 are mounted to a face of the rim 130 facing toward the lens 102 and configured to emit light toward the lens 102, i.e., toward a front edge of the light effect ring 120 (the right edge as shown in FIG. 6A). Other embodiments may comprise more or fewer than two pluralities of light emitters and/or light emitters that emit light in more or fewer directions than toward the center and forward.

In various embodiments, the light emitters 122 and 124 may comprise one or more individual light emitting diodes (LEDs) or other light emitting devices. Where the light emitters 122 and 124 includes a plurality of LEDs, the LEDs may emit light in the same or in multiple colors. In some embodiments the LEDs are red, green, blue, and white. In other embodiments any combination of red, green, blue, amber, lime, dark blue, and cyan LEDs may be used. In yet other embodiments, any combination and number of colors or white LEDs may be used. Examples of such other embodiments include any combination of two or more red, green, blue, amber, warm white, cold white, or tunable white mix. The light emitters 122 and 124 may be electrically coupled to the control system 1110 for local or remote control of their brightness and/or color, as described with reference to motion control of the zoom optical system 100 of FIG. 1. The brightness and/or color of the light emitters 122 and 124 may be controlled by the control system 1110 independently, in groups, or collectively.

Figure 6B:
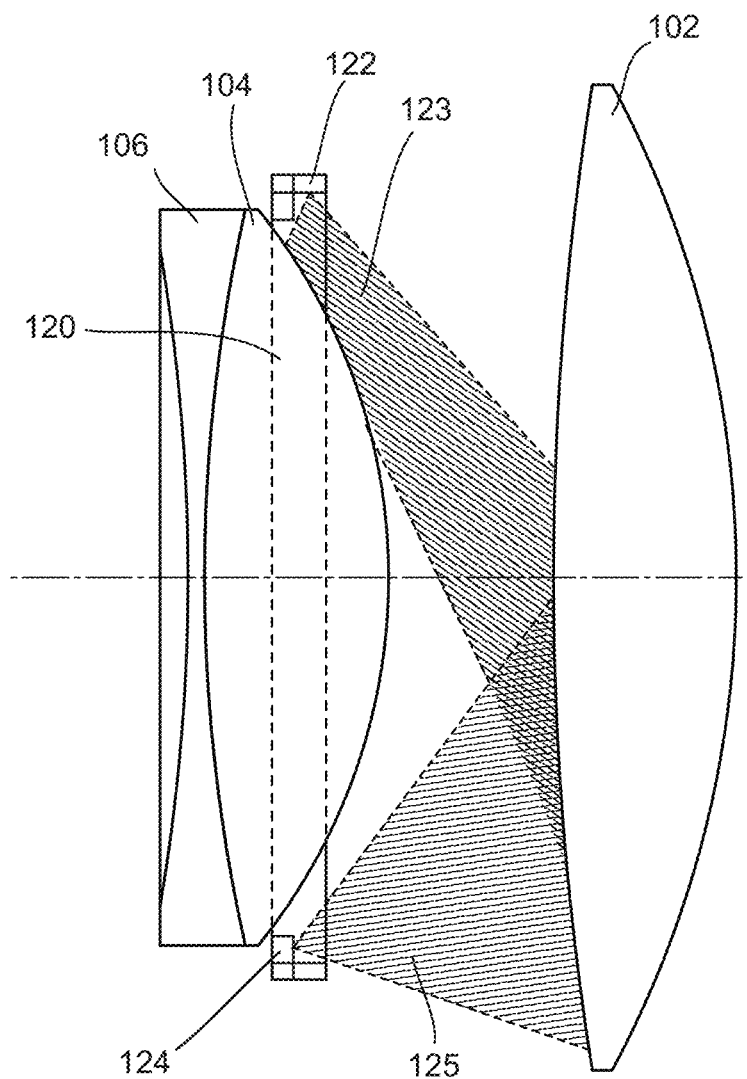
FIG. 6B presents a cross-section side view of a portion of the second zoom optical system according to the disclosure.

FIG. 6B presents a cross-section side view of a portion of the zoom optical system 400 according to the disclosure. The light effect ring 120 of FIG. 6B is in a different position relative to lenses 102 and 104 than in the embodiment in FIG. 4. In various embodiments, the light effect ring 120 may be positioned at any location between the lenses 102 and 104—e.g., a position adjacent to the lens 104 (as shown in FIG. 6B), a position intermediate between the lenses 104 and 102 (as shown in FIG. 4), or a position adjacent to the lens 102. As discussed above, the light effect ring 120 may be configured for motion along the optical axis to any location between the lenses 104 and 102. In FIG. 4, a portion of a light beam 700 is shown between lenses 104 and 102, indicating the location of the light effect ring 120 relative to the light beam 700. The light effect ring 120 may occlude an outer portion of the light beam 700. Similarly, in the position shown in FIG. 6B, the light effect ring 120 may occlude an outer portion of the light beam of the zoom optical system 400.

Depending upon a position of the light effect ring 120 relative to the lenses 102 and 104, the light emitters 122 and 124 illuminate one or both of the lenses 102 and 104 to produce an effect that is visible to a viewer outside of the luminaire 1100. The light emitters 122 emit a light beam 123 that obliquely illuminates a surface of one or both of the lenses 102 and 104 (e.g., a portion of the front surface of the lens 104 and a portion of the back surface of the lens 102). For the purposes of this application, the term "oblique" is defined as a light beam impinging a point on a surface at an angle greater than 30 degrees (30°) from a normal to the surface (i.e., from a vector perpendicular to the surface at the point). The light beam 123 represents only the light emitted by the light emitters 122 in the top portion (as depicted in FIG. 6B) of the light effect ring 120, but the light emitters 122 in other portions of the light effect ring 120 emit similar light beams 123 across the lenses 102 and 104 from other directions.

In the embodiment shown in FIG. 6B, the light emitters 122 illuminate both of the lenses 102 and 104 with the oblique light beam 123. In embodiments where the light effect ring 120 is positioned closer to the lens 102, the light beam 123 may obliquely illuminate only the back side of the lens 102.

The light emitters 124 emit a light beam 125 through the lens 102. The light beams 123 and 125 illuminate the back surface of the lens 102, as well as passing through the lens 102 to be emitted from the luminaire 1100. The light beam 125 represents only the light emitted by the light emitters 124 in the bottom portion (as depicted in FIG. 6B) of the light effect ring 120, but the light emitters 124 in other portions of the light effect ring 120 emit similar light beams 125 through the lens 102 from other locations around the light effect ring 120. In other embodiments, the light effect ring 120 may be used with other types of optical system (e.g., a fixed focus optical system) to produce a visible effect in an exit lens of such an optical system.

Figure 8:
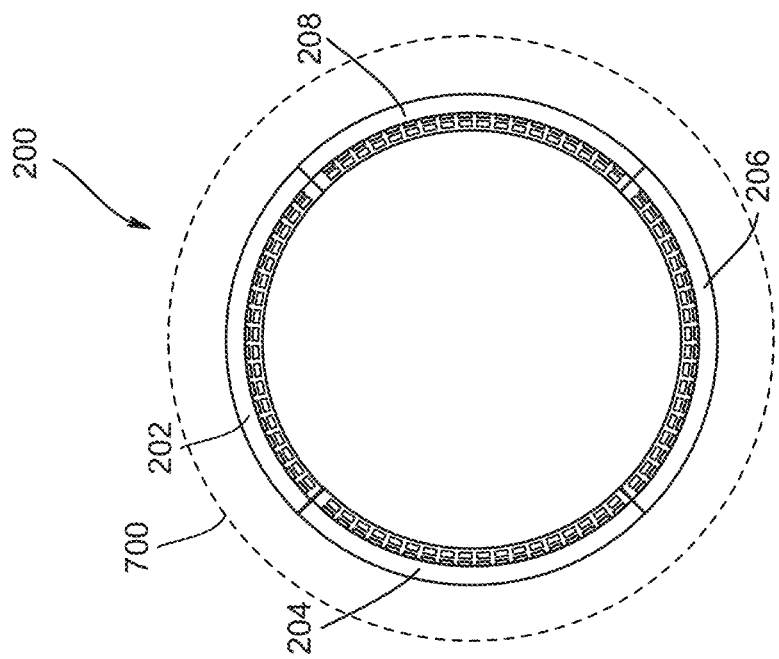
FIG. 8 presents a front view of the second light effect ring in a second configuration.
Figure 7:
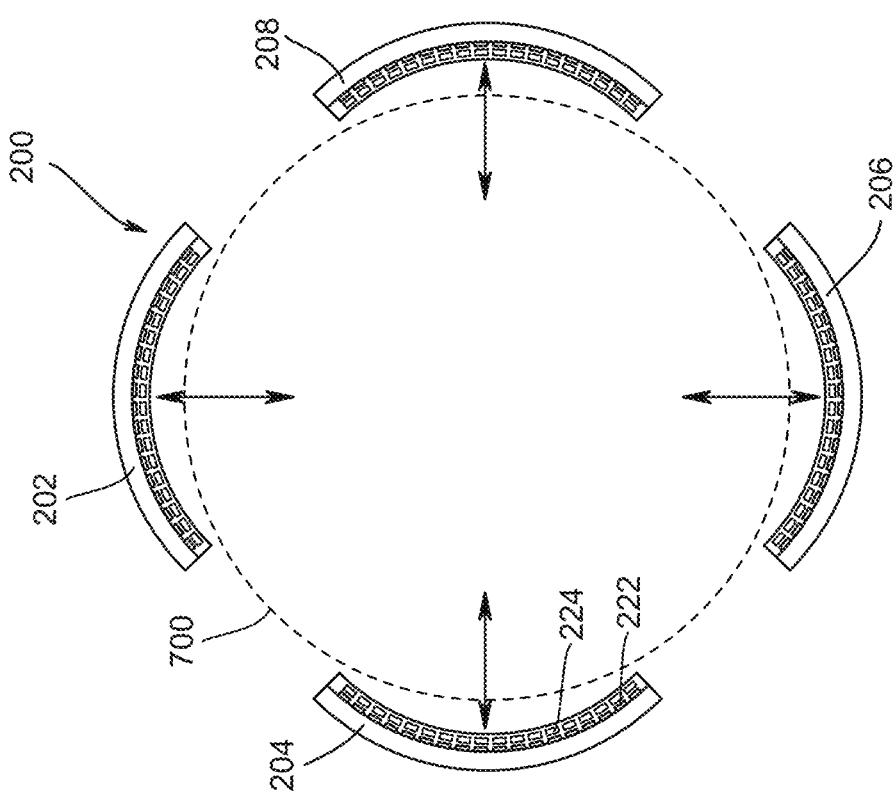
FIG. 7 presents a front view of a second light effect ring according to the disclosure, in a first configuration.

FIGS. 7 and 8 show front views of a second light effect ring 200 according to the disclosure, positioned in first and second configurations, respectively. The light effect ring 200 is configured to be moved within the luminaire 1100 into or out of position within the light beam 700. The light effect ring 200 includes light emitters 222 and 224, similar to the light emitters 122 and 124 of the light effect ring 120. Movement of the light effect ring 200 into or out of position within the light beam 700 enables an operator to choose whether the light emitters 222 and 224 are visible in the light beam 700.

To facilitate movement into and out of the light beam 700, the light effect ring 200 comprises a plurality of physical segments configured for independent or collective motion toward and away from the optical axis of the zoom optical system 900 that is described with reference to FIGS. 9 and 10. In some embodiments, the segments are configured for independent or collective motion parallel to the optical axis 150. The light effect ring 200 is split into 4 physical segments: 202, 204, 206, and 208, each segment comprising a subset of the light emitters 222 and a subset of the light emitters 224. Each segment 202, 204, 206, 208 is configured to be moved into or out of the light beam 700.

When all segments 202, 204, 206, 208 are moved into the light beam 700, the light effect ring 200 comprises a segmented cylinder having an axis, the cylinder segments having inner faces and outer faces. The axis of the light effect ring 200 is colinear with the optical axis 150. A rim comprises rim segments extending toward the axis of the light effect ring 200 from an edge of each segment of the light effect ring. The light emitters 222 are mounted to the inner faces of the cylinder segments and the light emitters 224 are mounted to faces of the rim segments that face toward the lens 102.

FIG. 7 shows the segments 202, 204, 206, and 208 of the light effect ring 200 in a first configuration, in which they are outside the light beam 700. FIG. 8 shows the segments 202, 204, 206, and 208 of the light effect ring 200 in a second configuration in which they have been assembled to form an unbroken light effect ring 200, positioned within the light beam 700. In some embodiments, the light effect ring 200 may be split into segments of different sizes. In other embodiments, the light effect ring 200 may be split into other numbers of segments than four. In various embodiments, each light effect ring segment may be controlled to move into or out of the optical path independently or in various groupings. For example, in a third configuration, the segments 202 and 206 may be moved into the beam 700 and the segments 204 and 208 moved outside the beam 700.

The moving segments 202, 204, 206, 208 may be mechanically coupled to hand-operated manual controls or to motors, linear actuators, or other electromechanical mechanisms for motion. As discussed above with reference to moving lens groups, the electromechanical mechanisms physically coupled to the moving segments 202, 204, 206, 208 may be electrically coupled to a control system (or controller) 1110 of the luminaire 1100, where the control system 1110 is configured to control motion of the electromechanical mechanisms and thus motion of the moving segments 202, 204, 206, 208 into and out of the beam 700. In various embodiments, the control system 1110 may be coupled for local control via a user interface 1112 or for remote control via a data link. In various such embodiments, the control system 1110 is configured to move the moving segments 202, 204, 206, 208 independently, in groups, or collectively in response to signals received via the data link on one or more control channels.

Figure 9:
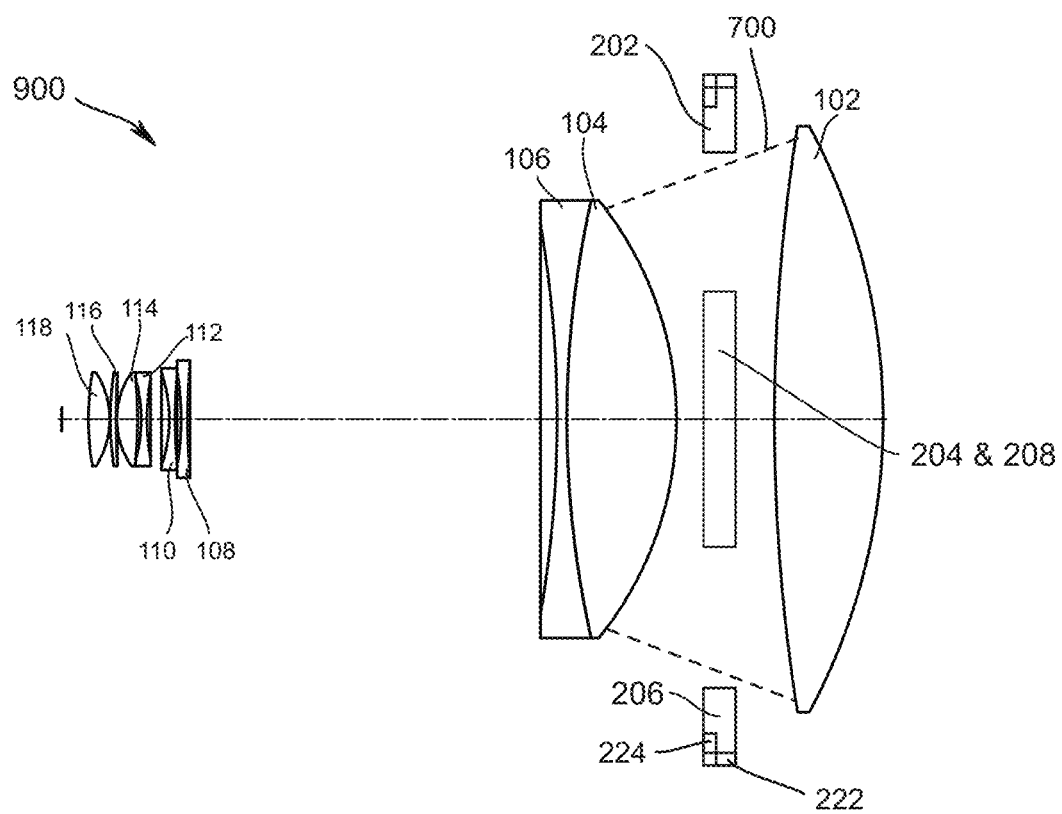
FIG. 9 presents a side view of a third zoom optical system according to the disclosure.
Figure 10:
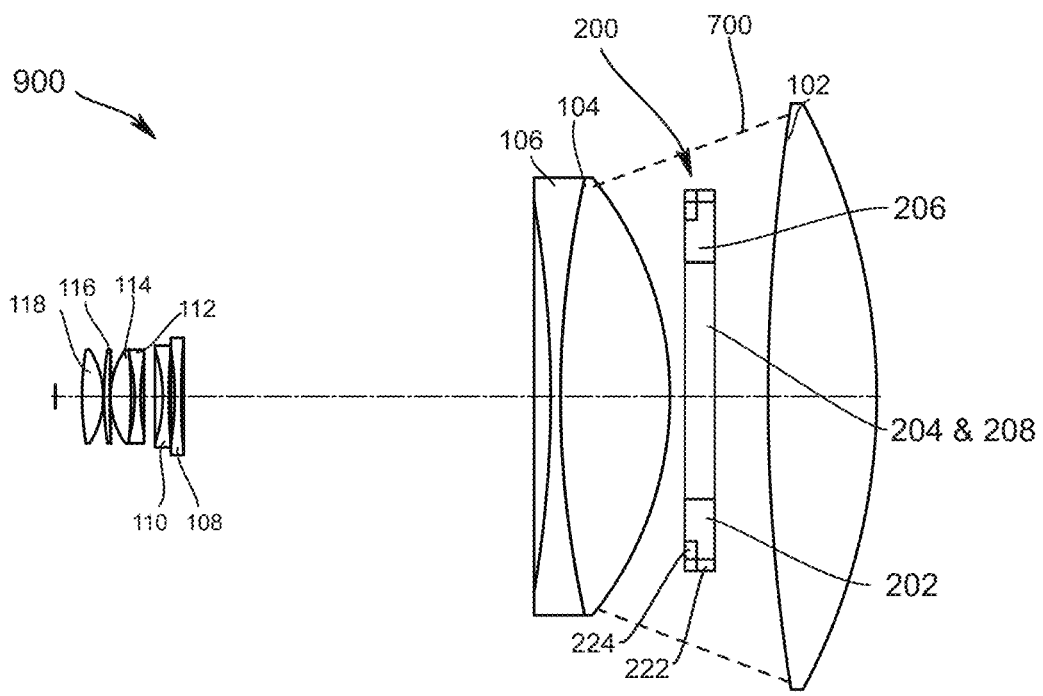
FIG. 10 presents a side view of the zoom optical system of FIG. 9.

FIG. 9 presents a side view of a third zoom optical system 900 according to the disclosure. The third zoom optical system 900 comprises the lens groups of the zoom optical system 100 and the light effect ring 200. The lens groups of the zoom optical system 100 are shown in the second configuration (described with reference to FIG. 4) and the light effect ring 200 is shown in the first configuration (described with reference to FIG. 7), where the light ring segments are moved out of the light beam 700. It may be seen that the segment 202 has been moved above the light beam 700 and the segment 206 has been moved below the light beam 700. The segments 204 and 208 have also been moved out of the light beam 700, in directions out of and into the page, respectively. FIG. 10 presents a side view of the zoom optical system 900 of FIG. 9. In FIG. 10 the lens groups of the zoom optical system 100 are shown in the second configuration and the second light effect ring 200 in the second configuration (described with reference to FIG. 8), moved into the light beam 700.

As described for the lens groups of the zoom optical system 100, the light effect ring segments 202, 204, 206, and 208 may be coupled to motors, linear actuators, or other electromechanical mechanisms for motion. Such electromechanical mechanisms may be electrically coupled (for local or remote control) to the control system of the luminaire 1100, as described with reference to the zoom optical system 100 of FIG. 1.

While the light effect rings 120 and 200 are circular or circular segments, in other embodiments a light effect according to the disclosure may have other shapes or other segment shapes. In various embodiments, the light effect ring or assembled segments may be square, triangular, hexagonal, oval, lobed, or any combination of such rectilinear and/or rounded shapes.

Figure 11:
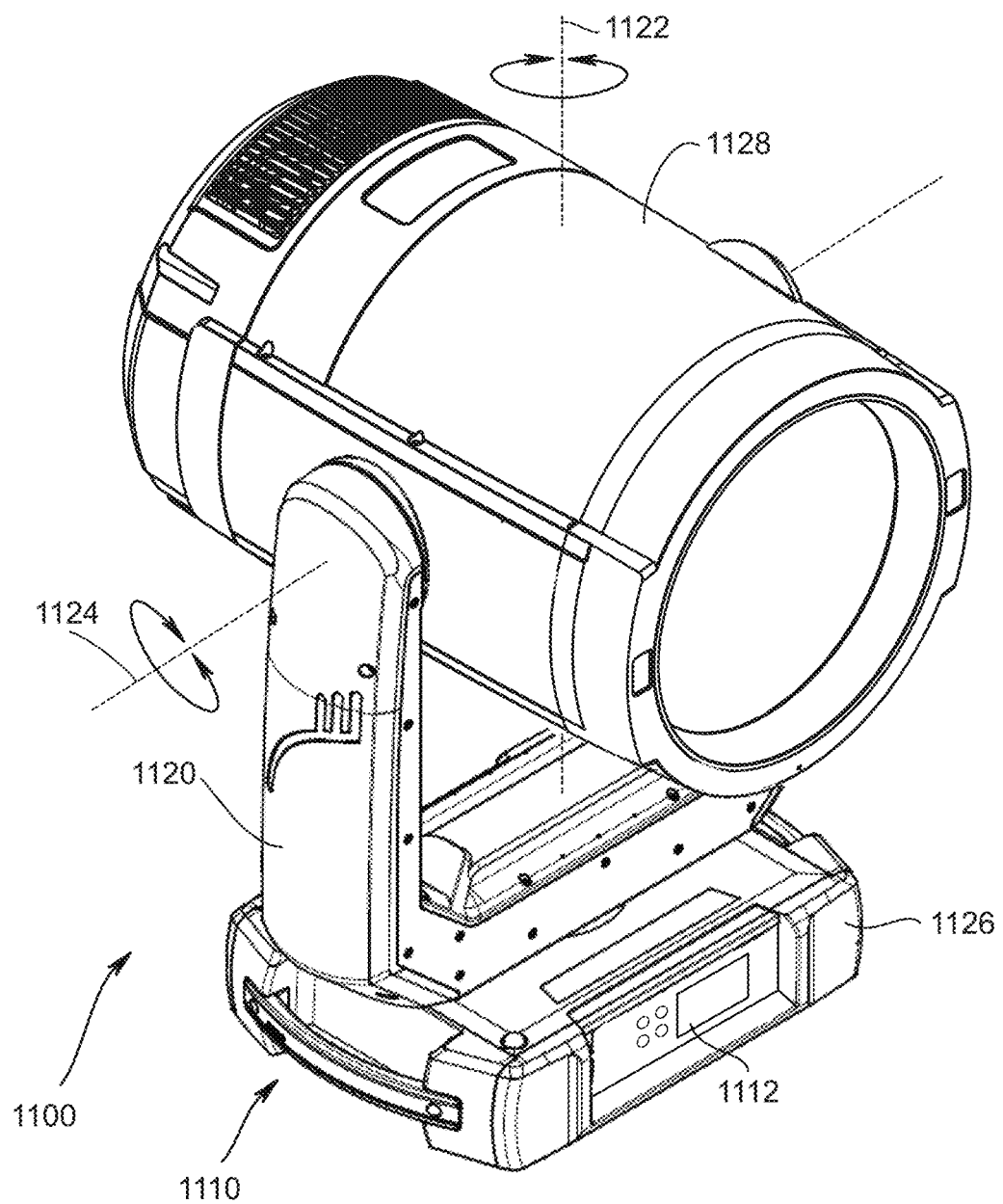
FIG. 11 presents an isometric view of a luminaire according to the disclosure.

FIG. 11 presents an isometric view of the luminaire 1100 according to the disclosure. The luminaire 1100 is an automated luminaire comprising a head 1128 which comprises any of the zoom optical system 100 or either of the zoom optical systems 400 or 900 with light effect ring 120, or 200. The head 1128 is coupled by a tilt mechanism to a yoke 1120 and configured to rotate within the yoke 1120 about a tilt axis 1124. The yoke 1120 is coupled by a pan mechanism to a fixed enclosure 1126 and configured to rotate relative to the fixed enclosure 1126 about a pan axis 1122. The pan axis 1122 and the tilt axis 1124 are orthogonal to each other. The luminaire 1100 further comprises the control system 1110 and the user interface 1112 as described with reference to the zoom optical system 100 of FIG. 1. The control system 1110 is located internal to the luminaire 1100 and is not visible in FIG. 11.

One or both of the pan and tilt mechanisms are mechanically coupled to hand-operated manual controls or to motors, linear actuators, or other electromechanically controlled mechanisms. Such electromechanical mechanisms may be electrically coupled (for local or remote control) to the control system 1110, as described with reference to the zoom optical system 100 of FIG. 1.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. An optical system comprising:
   a light source;
   a lens having a first surface and a second surface, the lens configured to receive at the first surface a first light beam originating at the light source and to emit a second light beam from the second surface; and
   a light effect ring comprising:
      first and second pluralities of light emitters, where the first plurality of light emitters are configured to emit second light beams to obliquely illuminate the first surface of the lens and the second plurality of emitters are configured to emit third light beams through the lens; and
      a plurality of segments configured for motion into and out of the first light beam, wherein each segment of the plurality of segments comprises a first subset of the first plurality of light emitters and a second subset of the second plurality of emitters.

2. The optical system of claim 1, wherein each segment of the plurality of segments is configured for independent motion into and out of the first light beam.

3. The optical system of claim 1, wherein, when all segments of the plurality of segments are moved into the first light beam, the light effect ring comprises:
   a segmented cylinder having an axis; and
   a rim comprising rim segments extending from an edge of each segment of the light effect ring toward the axis of the light effect ring,
   wherein the first plurality of light emitters are mounted to inner faces of the cylinder segments and the second plurality of emitters are mounted to faces of the rim segments facing toward the lens.

4. The optical system of claim 1, wherein the lens is a first lens, the optical system further comprising:
   a second lens having a third surface and a fourth surface, the second lens configured to receive at the third surface a fourth light beam originating at the light source and to emit the first light beam from the fourth surface, wherein the first plurality of light emitters is further configured to emit the second light beams to obliquely illuminate the fourth surface of the second lens.

5. The optical system of claim 4, wherein the light effect ring is configured for motion between a first position adjacent to the first lens and a second position adjacent to the second lens.

6. The optical system of claim 1, wherein each light emitter of one of the first and second pluralities of light emitters is configured for independent control of a color of light emitted by the light emitter.

7. The optical system of claim 1, wherein each light emitter of one of the first and second pluralities of light emitters is configured for independent control of a brightness of light emitted by the light emitter.

8. The optical system of claim 1, wherein each light emitter of the first plurality of light emitters is configured for independent control of a color of light emitted by the light emitter.

9. The optical system of claim 1, wherein each light emitter of the first plurality of light emitters is configured for independent control of a brightness of light emitted by the light emitter.

10. A luminaire comprising:
    the optical system of claim 1; and
    a control system electrically coupled to the first and second pluralities of light emitters and configured to control:
       emission of the second light beams from the first plurality of light emitters of the optical system;
       emission of the third light beams from the second plurality of light emitters of the optical system; and
       motion of the plurality of segments into and out of the first light beam.

11. An optical system comprising:
    a light source;
    a lens having a first surface and a second surface, the lens configured to receive at the first surface a first light beam originating at the light source and to emit a second light beam from the second surface; and a light effect ring comprising first and second pluralities of light emitters, where the first plurality of light emitters are configured to emit second light beams to obliquely illuminate the first surface of the lens and the second plurality of emitters are configured to emit third light beams through the lens.

12. The optical system of claim 11, wherein the light effect ring comprises:

a cylinder having an axis; and a rim extending from an edge of the light effect ring toward the axis of the light effect ring, wherein the first plurality of light emitters are mounted to an inner face of the cylinder and the second plurality of emitters are mounted to a face of the rim facing toward first lens.

13. The optical system of claim 11, wherein the lens is a first lens, the optical system further comprising:

a second lens having a third surface and a fourth surface, the second lens configured to receive at the third surface a fourth light beam originating at the light source and to emit the first light beam from the fourth surface, wherein the first plurality of light emitters is further configured to emit the second light beams to obliquely illuminate the fourth surface of the second lens.

14. The optical system of claim 13, wherein the light effect ring is configured for motion between a first position adjacent to the first lens and a second position adjacent to the second lens.

15. The optical system of claim 13, wherein the light effect ring occludes an outer portion of the first light beam.

16. The optical system of claim 11, wherein each light emitter of one of the first and second pluralities of light emitters is configured for independent control of a color of light emitted by the light emitter.

17. The optical system of claim 11, wherein each light emitter of one of the first and second pluralities of light emitters is configured for independent control of a brightness of light emitted by the light emitter.

18. A luminaire comprising:

the optical system of claim 11; and a control system electrically coupled to the first and second pluralities of light emitters and configured to control:

emission of the second light beams from the first plurality of light emitters of the optical system; and emission of the third light beams from the second plurality of light emitters of the optical system.

* * * * *